(12) United States Patent
Liao et al.

(10) Patent No.: US 10,551,660 B2
(45) Date of Patent: Feb. 4, 2020

(54) CHOLESTERIC LIQUID CRYSTAL WRITING BOARD

(71) Applicant: IRIS OPTRONICS CO., LTD., Tainan (TW)

(72) Inventors: Chi-Chang Liao, Tainan (TW);
Shu-Shien Liu, Tainan (TW);
Tsung-Ming Pai, Tainan (TW);
Fu-Ming Wang, Tainan (TW)

(73) Assignee: IRIS OPTRONICS CO., LTD., Tainan (TW)

( * ) Notice: Subject to any disclaimer, the term of this patent is extended or adjusted under 35 U.S.C. 154(b) by 0 days.

(21) Appl. No.: 15/997,374

(22) Filed: Jun. 4, 2018

(65) Prior Publication Data
US 2019/0302503 A1    Oct. 3, 2019

(30) Foreign Application Priority Data
Mar. 27, 2018 (TW) .............................. 107110572 A

(51) Int. Cl.
*G02F 1/1333* (2006.01)
*G02F 1/133* (2006.01)
(Continued)

(52) U.S. Cl.
CPC ...... *G02F 1/13338* (2013.01); *G02F 1/13318* (2013.01); *G02F 1/13439* (2013.01);
(Continued)

(58) Field of Classification Search
CPC ............. G02F 1/13338; G02F 1/13318; G02B 6/0073
See application file for complete search history.

(56) References Cited

U.S. PATENT DOCUMENTS 7,136,048 B2    11/2006 Yrjanainen et al.
8,878,817 B2 *  11/2014 Noma .................... G06F 3/0412
                                               345/175
(Continued)

FOREIGN PATENT DOCUMENTS

CN         106909246 A      6/2017
KR      20040085182 A     10/2004
(Continued)

OTHER PUBLICATIONS

Chen, English translation for Rewritable display medium writing device, Sep. 2011.*

*Primary Examiner* — Michael H Caley
*Assistant Examiner* — Jonathan Y Jung
(74) *Attorney, Agent, or Firm* — Muncy, Geissler, Olds & Lowe, P.C.

(57) ABSTRACT

A cholesteric liquid crystal writing board, which can display a writing track, includes a cholesteric liquid crystal device, an optical layer, a photo-sensing array and a voltage control circuit. The cholesteric liquid crystal device includes plural liquid crystal control areas. The optical layer has plural optical openings. The photo-sensing array includes plural photo sensors arranged in an array. The photo sensors are disposed corresponding to the optical openings. One of the photo sensors senses a luminous flux change and generates an erasing signal accordingly. The voltage control circuit receives the erasing signal and outputs a voltage signal accordingly to the liquid crystal control areas corresponding to the photo sensors having the luminous flux change, such that a part or all of cholesteric liquid crystals corresponding to the liquid crystal control areas are morphologically changed so as to clear a part or all of the writing trace.

14 Claims, 9 Drawing Sheets

(51) Int. Cl.
*G02F 1/1343* (2006.01)
*G06F 3/041* (2006.01)
*G02F 1/1335* (2006.01)

(52) U.S. Cl.
CPC .. *G02F 1/133512* (2013.01); *G02F 1/133553* (2013.01); *G02F 1/134336* (2013.01); *G06F 3/0416* (2013.01); *G02F 2203/66* (2013.01)

(56) References Cited

U.S. PATENT DOCUMENTS

| | | | |
|---|---|---|---|
| 2003/0156099 A1* | 8/2003 | Yrjanainen | G06F 3/0488 345/173 |
| 2008/0017884 A1* | 1/2008 | Jeong | G02F 1/133528 257/203 |
| 2009/0161051 A1* | 6/2009 | Fukunaga | G06F 3/0412 349/115 |
| 2012/0050654 A1* | 3/2012 | Kim | G06F 3/0412 349/116 |
| 2013/0207908 A1* | 8/2013 | Chang | G06F 3/0412 345/173 |
| 2014/0024152 A1 | 1/2014 | Sun et al. | |
| 2018/0275779 A1* | 9/2018 | Chen | G06F 3/03545 |

FOREIGN PATENT DOCUMENTS

| | | | |
|---|---|---|---|
| KR | 20090104787 A | | 10/2009 |
| KR | 20150136651 A | | 12/2015 |
| TW | 2012-M46287 | * | 9/2011 |
| TW | 201131535 | * | 9/2011 |
| TW | 201131535 A | | 9/2011 |

\* cited by examiner

CHOLESTERIC LIQUID CRYSTAL WRITING BOARD

CROSS REFERENCE TO RELATED APPLICATIONS

This Non-provisional application claims priority under 35 U.S.C. § 119(a) on Patent Application No(s). 107110572 filed in Taiwan, Republic of China on Mar. 27, 2018, the entire contents of which are hereby incorporated by reference.

BACKGROUND

Technology Field

The invention relates to a cholesteric liquid crystal writing board, and more particularly to a cholesteric liquid crystal writing board with an erasing function.

Description of Related Art

In cholesteric liquid crystals, chiral dopants are added to nematic liquid crystals to make the liquid crystal molecules to have a helical arrangement structure, and two different arrangement states of liquid crystal molecules rendering reflection and penetration under various voltage differences are utilized to achieve different light transmission rates to achieve the display effect. The principle is that, when a low voltage or a high voltage is externally applied, the liquid crystal molecules may be transformed into a focal conic state and a homeotropic state from the planar state, respectively. When the cholesteric liquid crystal molecules are in the planar state, part of the incident light is reflected to show a color. When the cholesteric liquid crystal molecules are in the focal conic state, most of the incident light pass through those molecules and a small portion thereof is scattered. When the cholesteric liquid crystal molecules are in the vertical state, the incident light may pass through those molecules completely.

The planar state and the focal conic state are both stable states. When the applied voltage is turned off, the state of the molecules and the displayed images stay. The voltage is only applied when the state of the cholesteric crystal liquid molecules need to be changed to another state and when the displayed images need to be refreshed. Its properties, such as power-saving and the memorability, also make the cholesteric liquid crystals become the first choice for e-books. In addition, this display mechanism is less affected by the gap between the upper and lower plates, and potentially can be applied in a bistable flexible display. Compared with other types (e.g. TN-type) of liquid crystal displays, the cholesteric liquid crystal display has the advantages of power-saving, colorful display, light-adjusting, and the ability to be applied in a bistable flexible display, which contribute to its wide application

SUMMARY

An objective of this disclosure is to provide a cholesteric liquid crystal writing board with the erasing function. The cholesteric liquid crystal writing board of the present disclosure utilizes the properties of the cholesteric liquid crystals, so that it can achieve power-saving and perform a function of erasing a partial portion, thereby expanding the application of the cholesteric liquid crystal writing board on the teaching or conference.

This disclosure provides a cholesteric liquid crystal writing board, which is capable of displaying a writing track. The cholesteric liquid crystal writing board includes a cholesteric liquid crystal device, an optical layer, a photo-sensing array, and a voltage control circuit. The cholesteric liquid crystal device includes a cholesteric liquid crystal layer, and the cholesteric liquid crystal device has a light-entering surface and a plurality of liquid crystal control areas. The optical layer is disposed at a side of the cholesteric liquid crystal device opposite to the light-entering surface, and the optical layer has a plurality of optical openings disposed corresponding to the liquid crystal control areas. The photo-sensing array is disposed at a side of the optical layer away from the cholesteric liquid crystal device, and the photo-sensing array includes a plurality of photo sensors arranged in an array. The photo sensors are disposed corresponding to the optical openings. One of the photo sensors senses a luminous flux change and generates an erasing signal accordingly, and the photo sensor corresponds to at least one of the liquid crystal control areas. The voltage control circuit is coupled to the photo-sensing array and the cholesteric liquid crystal device. The voltage control circuit receives the erasing signal and outputs a voltage signal accordingly to the liquid crystal control areas corresponding to the photo sensors having the luminous flux change, such that a part or all of cholesteric liquid crystals corresponding to the liquid crystal control areas are morphologically changed so as to clear a part or all of the writing trace.

In one embodiment, the cholesteric liquid crystal device further comprises a first substrate and a second substrate opposite to the first substrate, and the cholesteric liquid crystal layer is disposed between the first substrate and the second substrate. The cholesteric liquid crystal device further comprises a first transparent electroconductive layer disposed on a surface of the first substrate facing toward the cholesteric liquid crystal layer, and the cholesteric liquid crystal device further comprises a second transparent electroconductive layer disposed on one side of the second substrate facing toward the cholesteric liquid crystal layer.

In one embodiment, the first transparent electroconductive layer comprises a plurality of first electrodes extending in a first direction and separately disposed, the second transparent electroconductive layer comprises a plurality of second electrodes extending in a second direction and separately disposed, and the first direction is different from the second direction.

In one embodiment, when viewing from a top of the light-entering surface, the first electrodes are crossed with the second electrodes and their intersections are disposed in correspondence to the liquid crystal control areas.

In one embodiment, the voltage signal is applied to the first electrode and the second electrode, which correspond to the liquid crystal control areas corresponding to the photo sensor having the luminous flux change, so that a part or all of the cholesteric liquid crystals corresponding to the liquid crystal control areas are morphologically changed.

In one embodiment, the second transparent electroconductive layer comprises a plurality of electrode blocks arranged in an array, and the electrode blocks are disposed in correspondence with the liquid crystal control areas.

In one embodiment, the voltage signal is applied to the electrode blocks of the liquid crystal control areas corresponding to the photo sensor having the luminous flux change, so that a part or all of the cholesteric liquid crystals corresponding to the liquid crystal control areas are morphologically changed.

In one embodiment, the first transparent electroconductive layer and the second transparent electroconductive layer comprise a plurality of electrode blocks, which are disposed corresponding to each other, and the electrode blocks are disposed in correspondence with the liquid crystal control areas.

In one embodiment, the voltage signal is applied to the electrode blocks of the liquid crystal control areas corresponding to the photo sensor having the luminous flux change, so that a part or all of the cholesteric liquid crystals corresponding to the liquid crystal control areas are morphologically changed.

In one embodiment, the optical layer is a light-absorbing layer.

In one embodiment, the optical layer is a light-reflecting layer.

In one embodiment, the cholesteric liquid crystal writing board further comprises a third substrate, and the photo sensors are disposed on the third substrate.

In one embodiment, a light irradiates the light-entering surface of the cholesteric liquid crystal device to generate the luminous flux change, and the erasing signal comprises position information regarding to where the cholesteric liquid crystal device is irradiated by the light.

In one embodiment, the light is a visible light or an invisible light.

As mentioned above, in the cholesteric liquid crystal writing board of this disclosure, the cholesteric liquid crystal device has a plurality of liquid crystal control areas. The optical layer is disposed at a side of the cholesteric liquid crystal device opposite to the light-entering surface and has a plurality of optical openings disposed corresponding to the liquid crystal control areas. The photo-sensing array comprises a plurality of photo sensors arranged in an array and is disposed at a side of the optical layer away from the cholesteric liquid crystal device, and the photo sensors are disposed corresponding to the optical openings. One of the photo sensors senses a luminous flux change and generates an erasing signal accordingly. The voltage control circuit receives the erasing signal and outputs a voltage signal accordingly to the liquid crystal control areas corresponding to the photo sensors having the luminous flux change, such that a part or all of cholesteric liquid crystals corresponding to the liquid crystal control areas are morphologically changed so as to clear a part or all of the writing trace. Accordingly, the cholesteric liquid crystal writing board of this disclosure can utilize the properties of the cholesteric liquid crystals, so that it can achieve power-saving and perform a function of erasing a partial portion, thereby expanding the application of the cholesteric liquid crystal writing board on the teaching or conference.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

It is to be noted that all directional indications (such as up, down, left, right, front, rear and the like) in the embodiments of the present disclosure are only used for explaining the relative positional relationship, circumstances during its operation, and the like, between the various components in a certain specific posture (as shown in the accompanying drawings). If the specific posture changes, the directional indication will also change accordingly.

The cholesteric liquid crystal writing board provided in the embodiments of the present disclosure can be written or drawn to show texts and/or images on the writing surface thereof, and can be applied to, for example but without limiting to, mobile phones, tablets, electronic whiteboards, or any other display devices that can display images. In this invention, an erasing function may be performed to erase partial or all portions of a writing track shown on the cholesteric liquid crystal writing board.

The cholesteric liquid crystal writing boards in the following embodiments are exemplified by large-sized electronic blackboards (or whiteboards) applied to an interactive writing system, such as those used in a conference or a classroom, but the present disclosure is not limited thereto. The cholesteric liquid crystal writing boards provided in the embodiments of the present disclosure utilize the properties of cholesteric liquid crystal molecules and are therefore bistable display apparatuses. When the cholesteric liquid crystal writing board displays an image or a frame, no additional power is required, and this image or frame stays as is. Additional power is only required when the cholesteric crystal molecules needs to be changed to another state or the displayed frame(s) needs to be refreshed. Hence, the cholesteric liquid crystal writing board is a relatively power-saving electronic device.

Figure 1A:
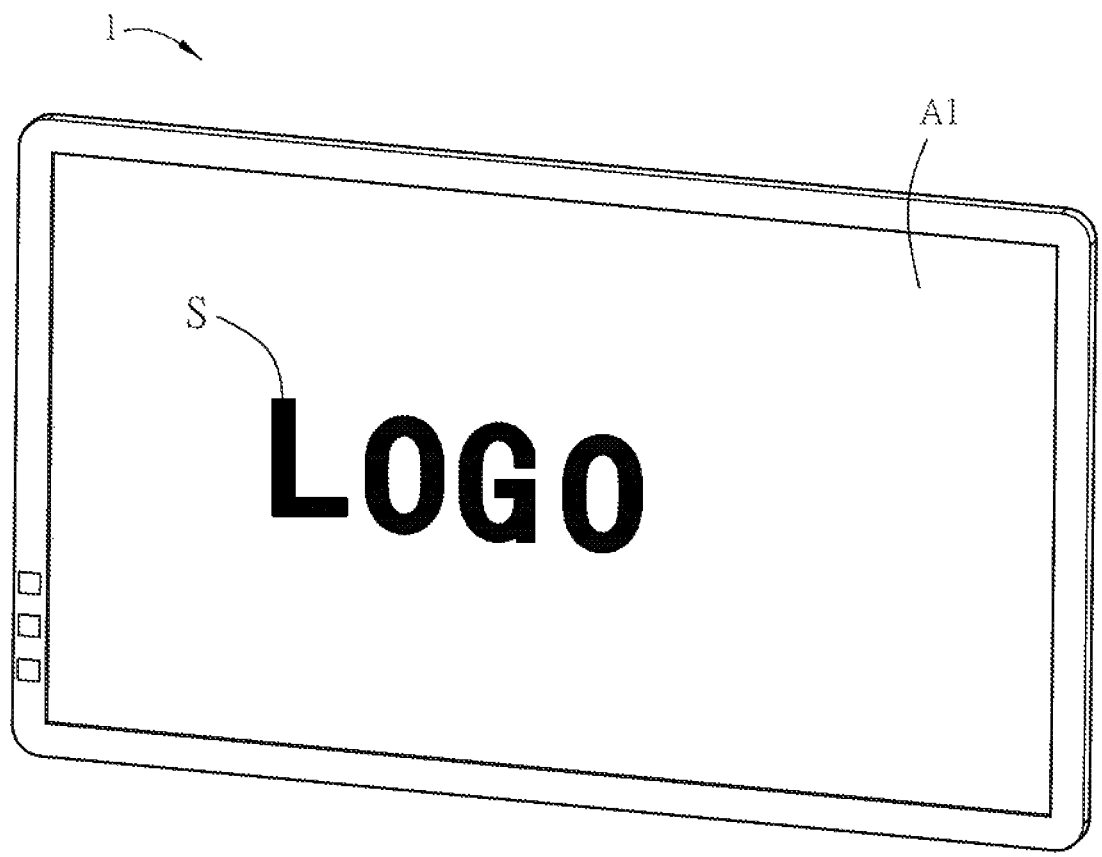
FIG. 1A is a schematic application view showing an embodiment of the cholesteric liquid crystal writing board of this disclosure.
Figure 1B:
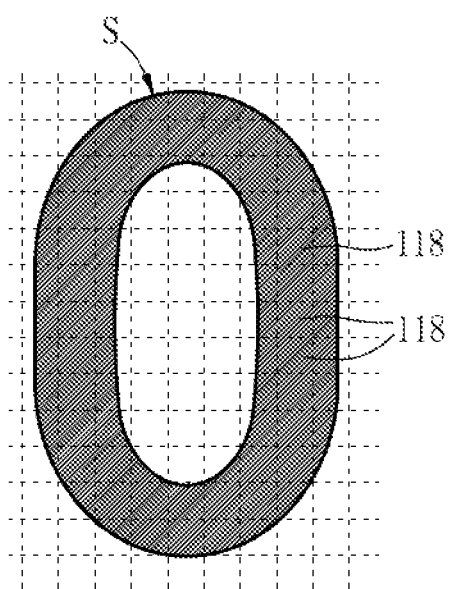
FIG. 1B is a partially enlarged schematic view showing a writing track of FIG. 1A.
Figure 1C:
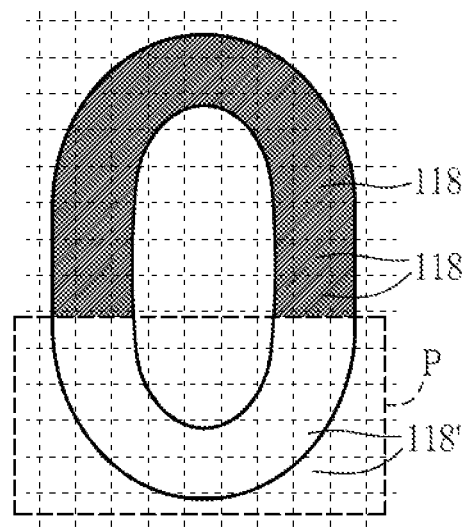
FIG. 1C shows that the writing track of FIG. 1B is partially erased.
Figure 2A:
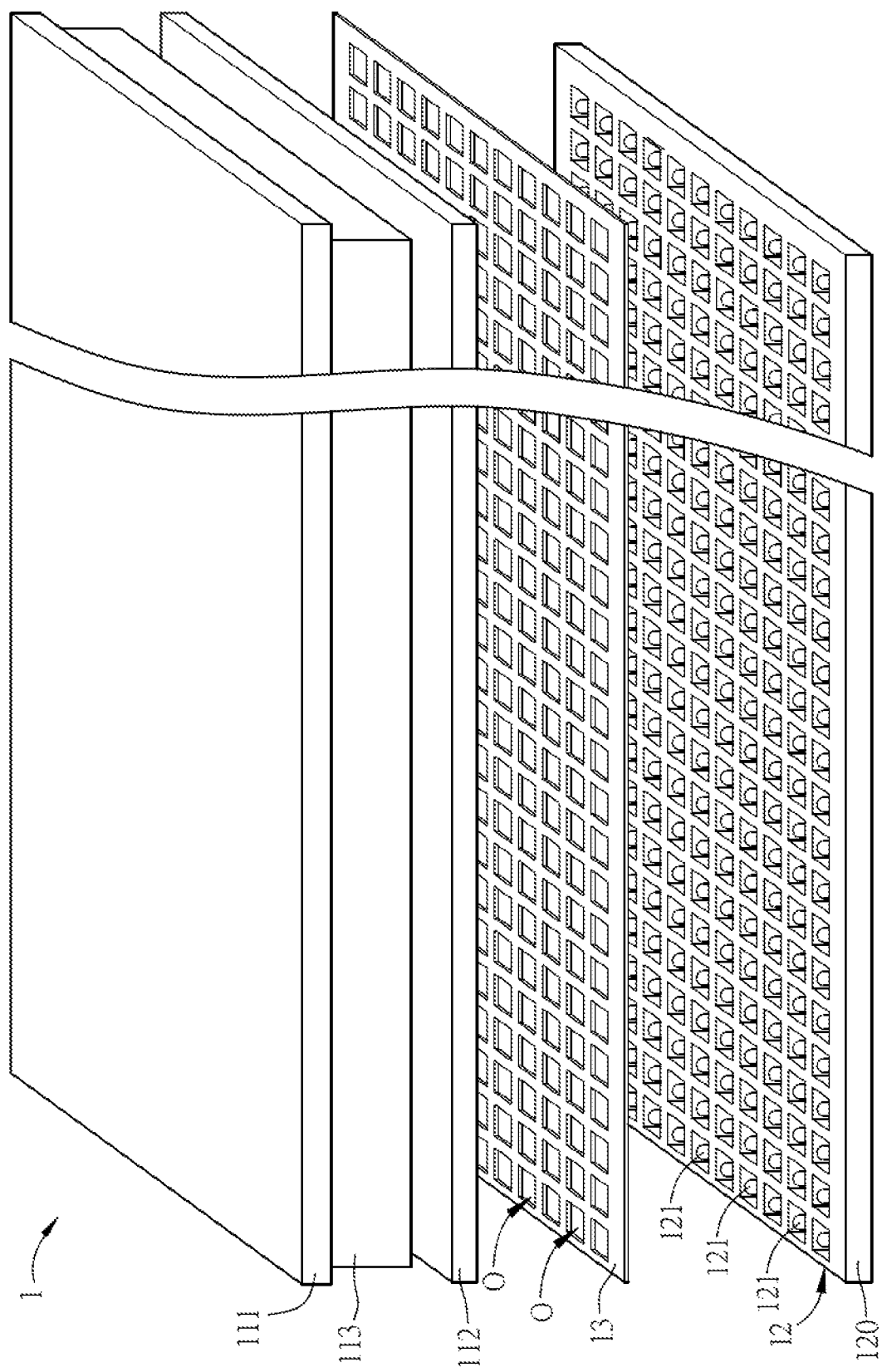
FIG. 2A is a partially-exploding stereoscopic schematic view showing an embodiment of the cholesteric liquid crystal writing board of this disclosure.
Figure 2B:
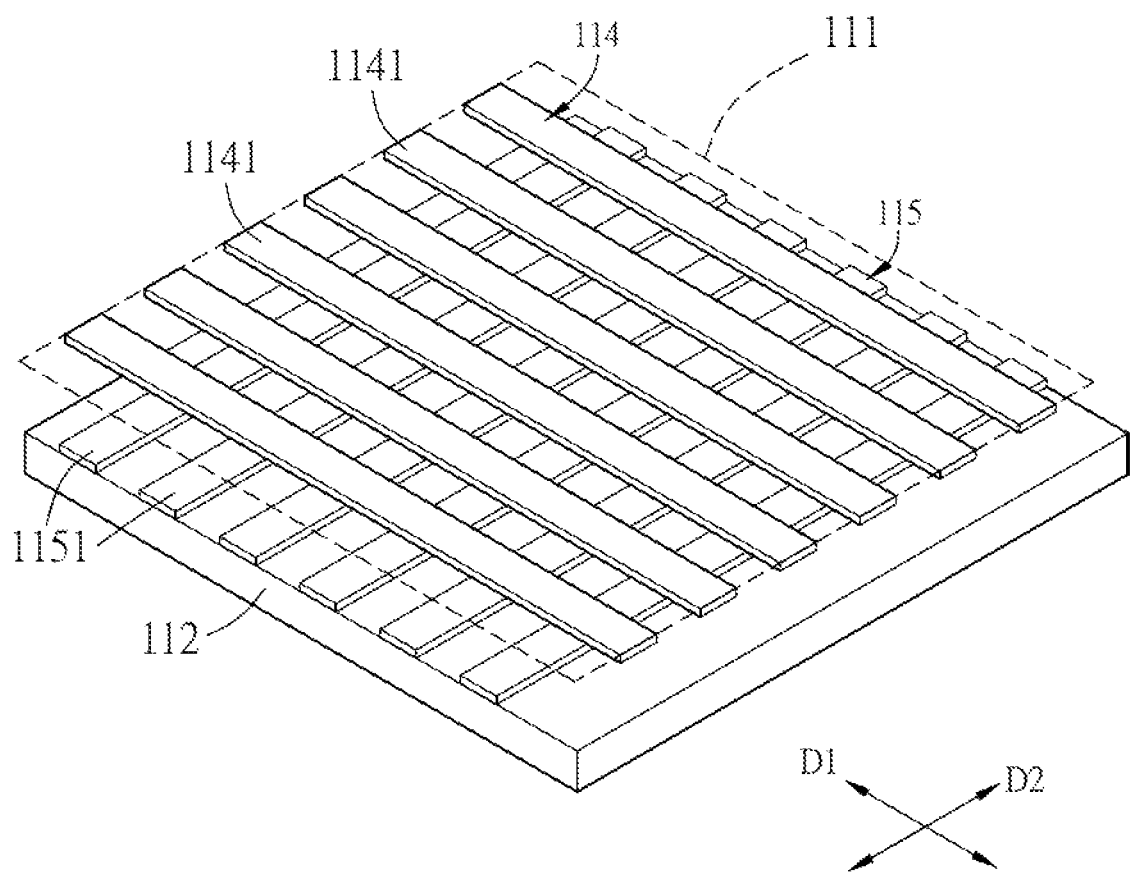
FIG. 2B is a partially stereoscopic view showing an embodiment of the cholesteric liquid crystal writing board of this disclosure.
Figure 2C:
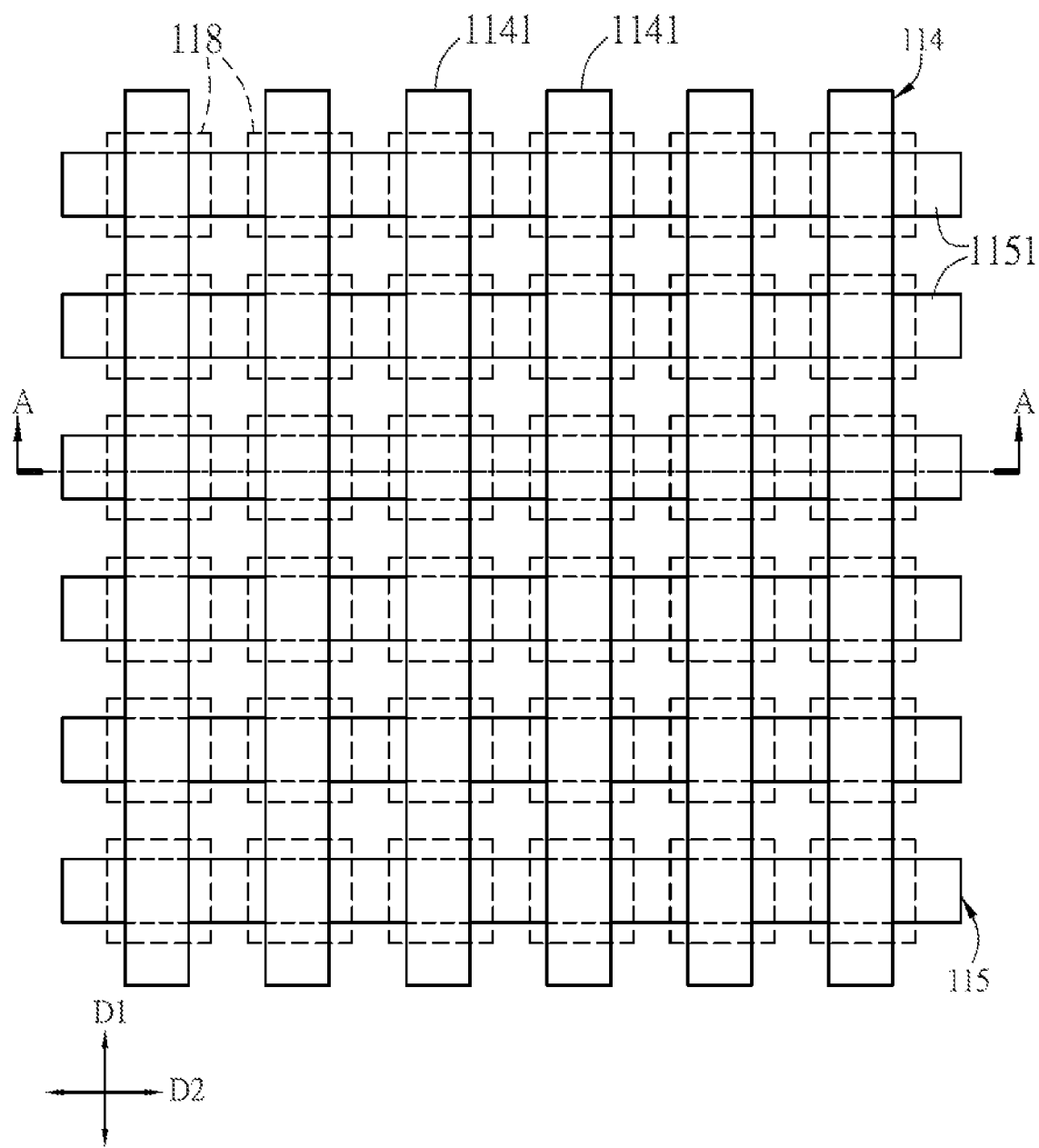
FIG. 2C is a schematic top view showing a first transparent electroconductive layer and a second transparent electroconductive layer of the cholesteric liquid crystal writing board of FIG. 2B.
Figure 2D:
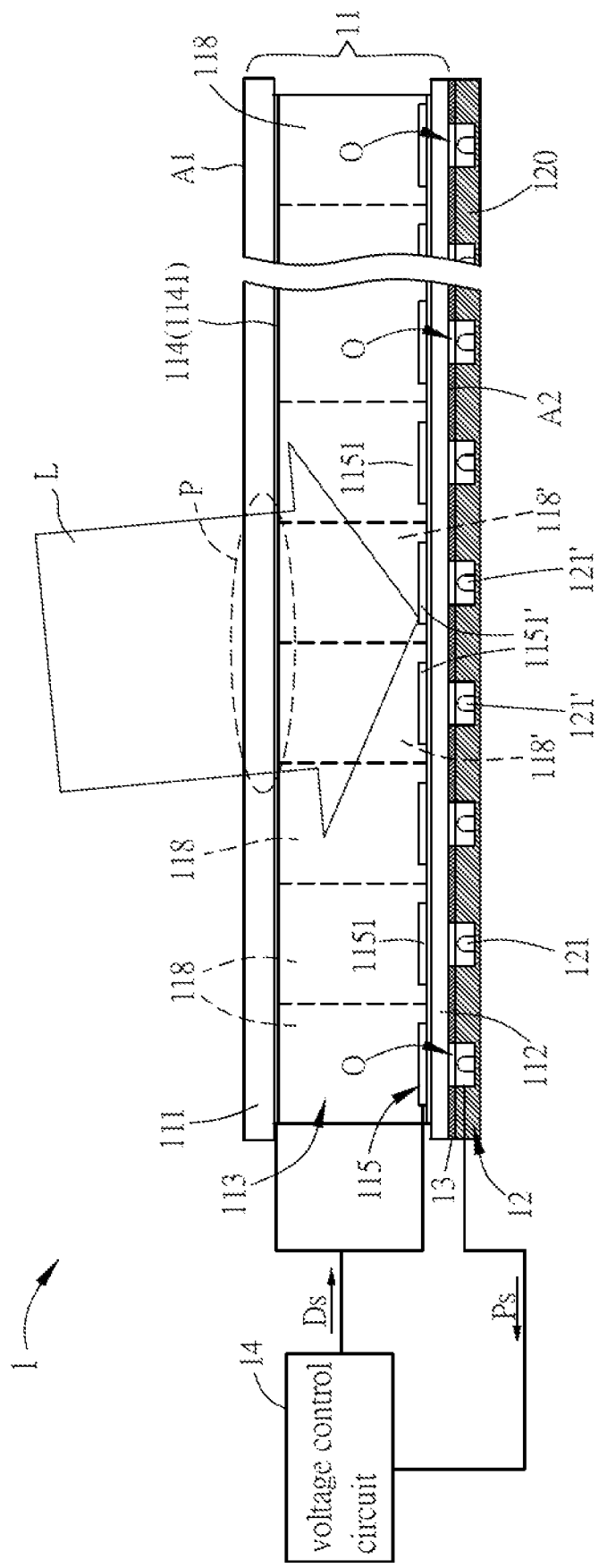
FIG. 2D is a schematic view showing the cholesteric liquid crystal writing board of FIG. 1A.

FIG. 1A is a schematic application view showing an embodiment of the cholesteric liquid crystal writing board of this disclosure. FIG. 1B is a partially enlarged schematic view showing a writing track of FIG. 1A. FIG. 1C shows that the writing track of FIG. 1B is partially erased. FIG. 2A is a partially-exploding stereoscopic schematic view showing an embodiment of the cholesteric liquid crystal writing board of this disclosure. FIG. 2B is a partially stereoscopic view showing an embodiment of the cholesteric liquid crystal writing board of this disclosure. FIG. 2C is a schematic top view showing a first transparent electroconductive layer and a second transparent electroconductive layer of the cholesteric liquid crystal writing board of FIG. 2B. FIG. 2D is a schematic view showing the cholesteric liquid crystal writing board of FIG. 1A.

As shown in FIG. 1A and FIG. 2A to FIG. 2D, a cholesteric liquid crystal writing board 1 is capable of displaying a writing track S. The cholesteric liquid crystal writing board 1 may comprise a cholesteric liquid crystal device 11, a photo-sensing array 12, an optical layer 13 and a voltage control circuit 14.

The cholesteric liquid crystal device 11 has a light-entering surface A1 and a light-emitting surface A2 opposite to the light-entering surface A1, and the cholesteric liquid crystal device 11 comprises a plurality of liquid crystal control areas 118 (as shown in FIG. 2C and FIG. 2D). The light-entering surface A1 of this embodiment is a surface of the cholesteric liquid crystal writing board 1 facing toward the user, and is also referred to a writing surface or a display surface. The user can write thereon to generate a writing track S. In some embodiments, a protective film layer or protective substrate may be further provided on the light-entering surface A1 to protect the cholesteric liquid crystal writing board 1. The cholesteric liquid crystal device 11 may display a color correspondingly. In details, the cholesteric liquid crystal device 11 may be prepared to show colors, such as red (R), green (G), or blue (B) and the like, by adding various chiral dopants with different contents. Herein, the color correspondingly displayed by the cholesteric liquid crystal device 11 may be selected from, for example but without limiting to, either red, green, blue, or other color of visible light. The specific orientation of the cholesteric liquid crystal molecules is achieved by adding chiral dopants to the nematic liquid crystal molecules. The display and erasing function is achieved by using cholesteric liquid crystal molecules which may exhibit various stable states and transient states, such as at least a focal conic state, a planar state and a homeotropic state, and the like, under various voltages, physical pressures and/or temperatures. Hence, by changing the axial orientation of the helical structure of the cholesteric liquid crystal molecules, a portion of the incident light is reflected and/or a portion of the light may pass through the cholesteric liquid crystals. In other words, the display, writing, and/or erasing functions of the cholesteric liquid crystal device 11 may be achieved with the different optical reflectance or transmittance possessed by the cholesteric liquid crystal molecules at different stable states or transient states.

The optical layer 13 is disposed at one side of the cholesteric liquid crystal device 11 away from the light-entering surface A1. The optical layer 13 can be, for example but not limited to, a coating layer disposed on the light-emitting surface A2 of the cholesteric liquid crystal device 11. The optical layer 13 can be a black light-absorbing layer or a white light-reflecting layer. When the optical layer 13 is the black light-absorbing layer, it absorbs the light that passes through the cholesteric liquid crystal device 11 and makes the cholesteric liquid crystal writing board 1 become a blackboard. In some embodiments, the material of the black light-absorbing layer may be the same as the material of the black matrix of the liquid crystal display device. In addition, when the optical layer 13 is a white light-reflecting layer, it reflects the light that passes through the cholesteric liquid crystal device 11 and makes the cholesteric liquid crystal writing board 1 become a whiteboard. In some embodiments, the material of the white light reflective layer may comprise, for example, metal, metal oxide, a highly reflective paint (white paint) or a combination thereof, but the present disclosure is not limited thereto. Alternatively, in different embodiments, the color of the optical layer 13 is also not limited to black or white, and may be one of other colors or a combination of multiple colors. In this embodiment, the optical layer 13 is, for example, a black light-absorbing layer. The optical layer 13 has a plurality of optical openings O, which are disposed corresponding to the liquid crystal control areas 118. In this embodiment, the optical openings O may be corresponding to one or more liquid crystal control areas 118. As shown in FIG. 2D, each optical opening O is disposed corresponding to one liquid crystal control area 118. The optical openings O can be the transparent areas of the optical layer 13, which are for example the transparent areas caused by the transparent thin film, or physical openings. In this embodiment, the optical openings O are physical openings.

The photo-sensing array 12 is disposed on one side of the optical layer 13 away from the cholesteric liquid crystal device 11, and the optical layer 13 is disposed between the cholesteric liquid crystal device 11 and the photo-sensing array 12. The photo-sensing array 12 may comprise a plurality of photo sensors 121, which are disposed corresponding to the optical openings O. Each photo sensor 121 may correspond to an optical opening O (see FIGS. 2A and 2D). The photo sensors 121 can be packaged photo sensing elements, such as, for example but not limited to, photo diodes or photo sensing resistors, for sensing the light and outputting electric signals. One photo sensor 121 may correspond to at least one or a plurality of liquid crystal control areas 118. As shown in FIG. 2D, in this embodiment, as an example, a photo sensor 121 corresponds to an optical opening O and a liquid crystal control area 118. One or more of the photo sensors 121 disposed in the photo-sensing array 12 can sense a luminous flux change and generate an erasing signal Ps accordingly. The voltage control circuitry 14 is coupled to the photo-sensing array 12 and the cholesteric liquid crystal device 11. The voltage control circuit 14 can receive the generated erasing signal Ps, and accordingly output a voltage signal Ds to the liquid crystal control area 118 corresponding to the photo sensor 121 having the luminous flux change, so that cholesteric liquid crystals corresponding to partial or all portions of the liquid crystal control areas 118 are morphologically changed to erase, partially or entirely, the writing track S accordingly. In details, when the light L irradiates the cholesteric liquid crystal device 11 and the photo-sensing array 12 senses the luminous flux change to generate the erasing signal Ps, the position of the photo sensors 121 (which receives the light L) in the photo-sensing array 12 can be obtained, and thus the position of the irradiation region P caused by the light L on the cholesteric liquid crystal device 11 can be obtained. Later, by using the voltage control circuit 14 to control the cholesteric liquid crystal molecules in partial or all of the liquid crystal control areas 118 corresponding to the irradiation region P to undergo a morphological change, the writing track S in the irradiation region P can be erased, partially or entirely.

Hereinafter, the structure of the cholesteric liquid crystal device 11 will be described. In this embodiment, FIG. 2D depicts a cross-sectional view of the first transparent electroconductive layer 114 and the second transparent electroconductive layer 115 of the cholesteric liquid crystal device 11 along the A-A line shown in FIG. 2C. As shown in through FIG. 2B to FIG. 2D, the cholesteric liquid crystal device 11 may comprise a first substrate 111, a second substrate 112 and a cholesteric liquid crystal layer 113. The first substrate 111 is disposed opposite to the second substrate 112, the cholesteric liquid crystal layer 113 has a plurality of cholesteric liquid crystal molecules (not shown in the drawings), and the cholesteric liquid crystal molecules may be filled between the first substrate 111 and the second substrate 112. The cholesteric liquid crystal device 11 further comprises a first transparent electroconductive layer 114 disposed on a surface of the first substrate 111 facing toward the cholesteric liquid crystal layer 113. The cholesteric liquid crystal device 11 further comprises a second transparent electroconductive layer 115 disposed on one side of the second substrate 112 facing toward the cholesteric liquid crystal layer 113.

Figure 3A:
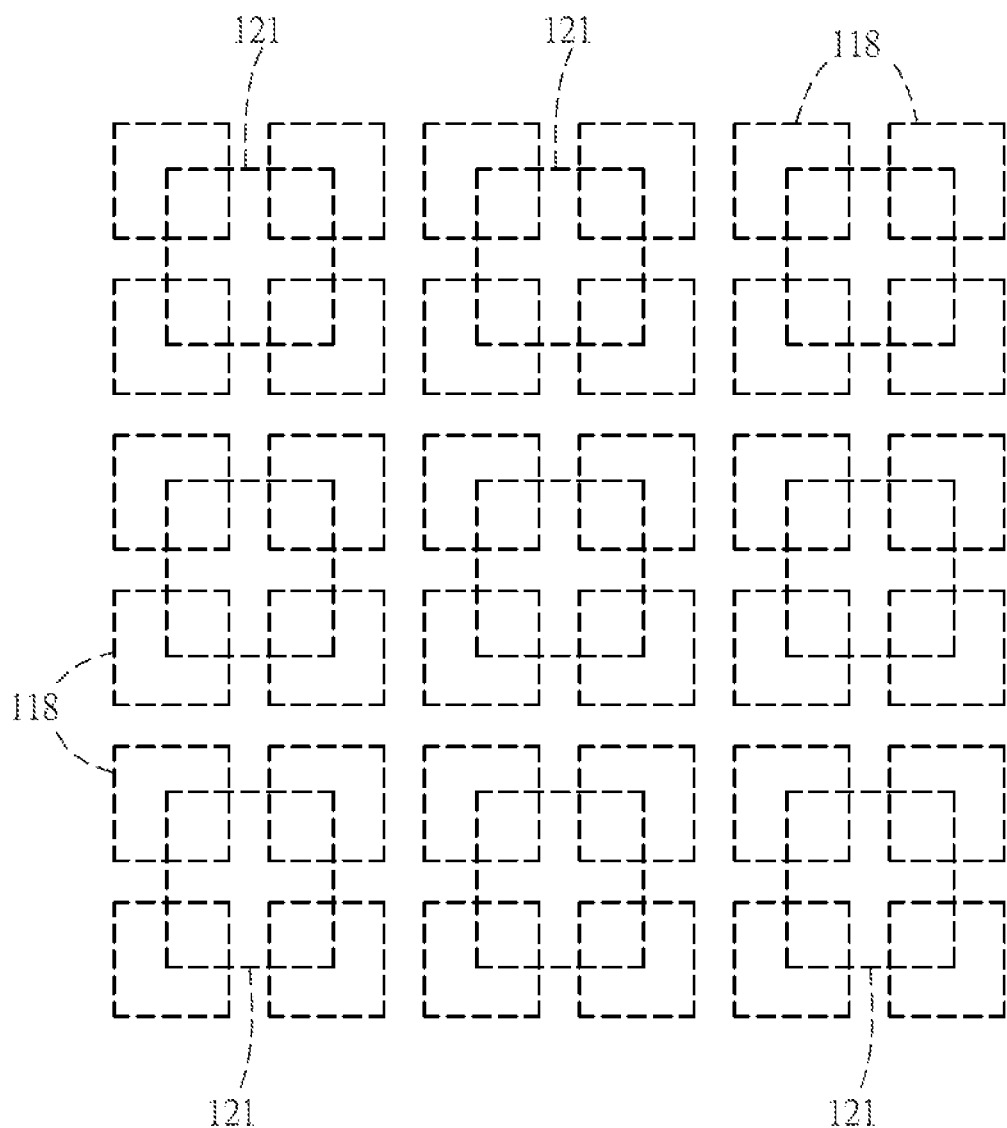
FIG. 3A is a schematic view showing an embodiment regarding to the correspondence between the liquid crystal control areas and the photo-sensing areas of the cholesteric liquid crystal writing board of this disclosure.
Figure 3B:
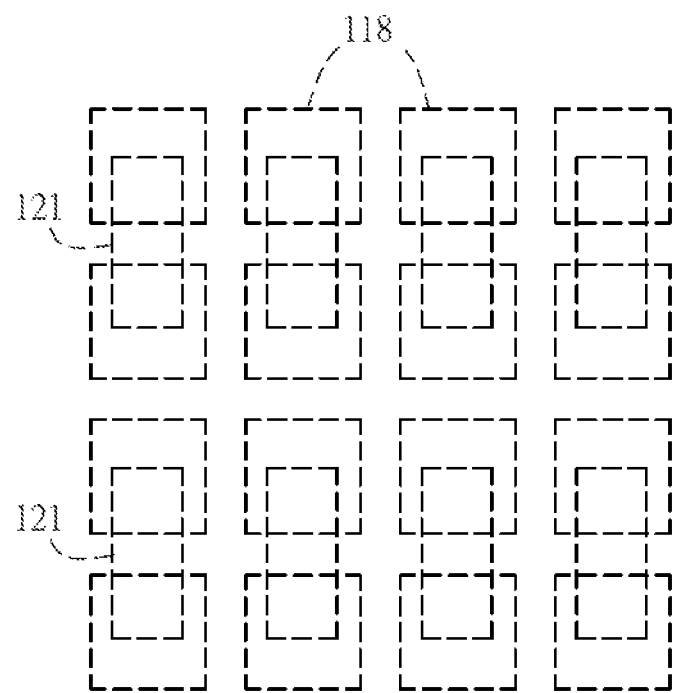
FIG. 3B is a schematic view showing another embodiment regarding to the correspondence between the liquid crystal control areas and the photo-sensing dot-areas of the cholesteric liquid crystal writing board of this disclosure.
Figure 3C:
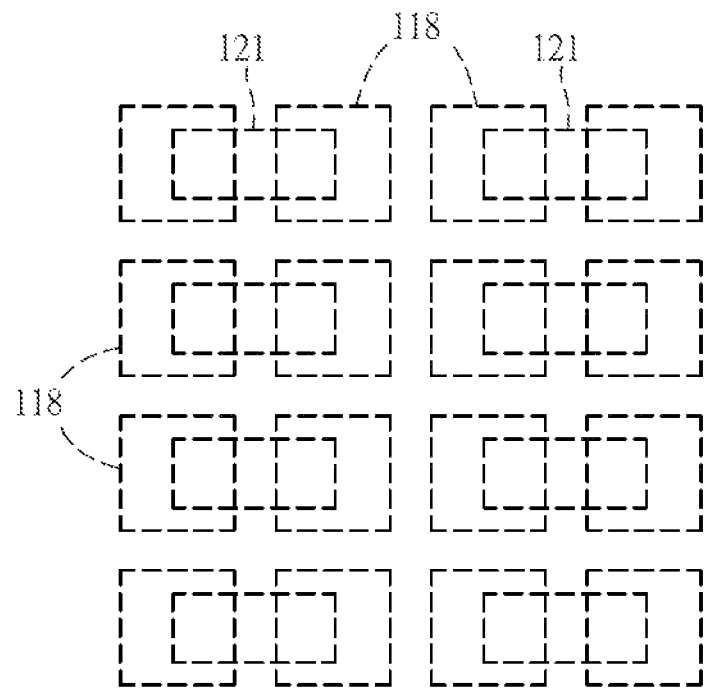
FIG. 3C is a schematic view showing still another embodiment regarding to the correspondence between the liquid crystal control areas and the photo-sensing dot-areas of the cholesteric liquid crystal writing board of this disclosure.

As shown in FIG. 2B and FIG. 2C, the first transparent electroconductive layer 114 of this embodiment comprises a plurality of first electrodes 1141 which extend in a first direction D1 and are separately disposed, the second transparent electroconductive layer 115 comprises a plurality of second electrodes 1151 which extend in a second direction D2 and are separately disposed. The first direction D1 is different from the second direction D2. Herein, the first direction D1 and the second direction D2 may form an angle, which comprises, for example but without limiting to, 90 degrees. Hence, from a top view of the light-entering surface A1, the first electrodes 1141 are crossed with the second electrodes 1151 and their intersections are disposed in correspondence to the liquid crystal control areas 118. Herein, the cholesteric liquid crystal molecules corresponding to the intersection of the first electrode 1141 and the second electrode 1151 can form a liquid crystal control area 118 (see also FIG. 2D), and a liquid crystal control area 118 may be disposed correspondingly to an optical opening O and a photo sensor 121 (for the sake of clarity of the drawing, the optical opening O and the photo sensor 121 are not shown in FIG. 2B and FIG. 2C). Alternatively, in other embodiments, as shown in FIG. 3A, multiple (e.g., four) liquid crystal control areas 118 may be also disposed in correspondence to the same one photo sensor 121. Further alternatively, as shown in FIG. 3B, every two liquid crystal control areas 118 in a column are disposed in correspondence to a photo sensor 121. Still alternatively, as shown in FIG. 3C, every two liquid crystal control areas 118 in a row are disposed in correspondence to a photo sensor 121. For the sake of clarity of the drawing, the first electrode 1141, the second electrode 1151 and the optical opening O are not shown in FIGS. 3A to 3C. However, the amount of the liquid crystal control areas 118 that are disposed in correspondence to a photo sensor 121 or an optical opening O and the arrangement of the two components may be adjusted according to practical requirement(s), but this disclosure is not limited thereto.

Referring again to FIG. 2C and FIG. 2D, the voltage control circuit 14 controls a voltage difference between the first electrode 1141 and the second electrode 1151 to control the orientation state of the cholesteric liquid crystal molecules at the intersection region of the first electrode 1141 and the second electrode 1151, thereby controlling the morphological change of the cholesteric liquid crystal molecules. In addition, the cholesteric liquid crystal device 11 may further comprise a sealing layer (not shown). The sealing layer is disposed between the first substrate 111 and the second substrate 112, and seals the outer peripheries of the first substrate 111 and the second substrate 112, so that a gap is formed between the first substrate 111 and the second substrate 112. A chamber may be formed by the first substrate 111, the second substrate 112 and the sealing layer, so that the cholesteric liquid crystal molecules may be filled into the chamber to form the cholesteric liquid crystal layer 113. It is noted that in this embodiment, the light-entering surface A1 of the cholesteric liquid crystal device 11 refers to the upper surface of the first substrate 111 which is disposed opposite to (or away from) the cholesteric liquid crystal layer 113, and the light-emitting surface A2 refers to the lower surface of the second substrate 112 which is disposed opposite to (or away from) the cholesteric liquid crystal layer 113. Alternatively, the light-entering surface A1 may refer to the upper surface of the cholesteric liquid crystal layer 113 facing toward the first substrate 111, and the light-emitting surface A2 may refer to the lower surface of the cholesteric liquid crystal layer 113 facing toward the second substrate 112, or any combination of the preceding examples, but the present invention is not limited thereto.

In this embodiment, the first substrate 111 and the second substrate 112 may individually comprise a transparent substrate, and may be a flexible transparent substrate or a rigid transparent substrate. The material of the flexible transparent substrate comprises, for example but without limiting to, polyimide (PI), polycarbonate (PC) or polyethylene terephthalate (PET). The material of the rigid transparent substrate comprises, for example but without limiting to, glass, quartz or sapphire. If the first substrate 111 and the second substrate 112 are both made of the flexible transparent material(s), then the cholesteric liquid crystal writing board 1 may be made into a curved display because such transparent substrate is flexible. In addition, the first transparent electroconductive layer 114 and the second transparent electroconductive layer 115 may be, for example but without limiting to, indium tin oxide (ITO) or indium zinc oxide (IZO), but the present invention is not limited thereto.

Hereinafter, it is to describe how the cholesteric liquid crystal writing board 1 obtains the occurrence position of a morphological change of the cholesteric crystal molecules and thus obtains the irradiation position of the light L on the cholesteric liquid crystal device 11 when the luminous flux changes are occurred in the cholesteric liquid crystal device 11.

Please refer again to through FIG. 1A to FIG. 1C and through FIG. 2A to FIG. 2D. In the cholesteric liquid crystal writing board 1 of this embodiment, when the user writes a letter, a character, or a word, or draws a figure on the cholesteric liquid crystal writing board 1 to cause the orientation of the cholesteric liquid crystal molecules in the corresponding liquid crystal control area(s) 118 to become a planar state due to the pressure in the cholesteric liquid crystal device 11 so as to generate the writing track S (e.g., a "LOGO" pattern shown in FIG. 1A), the writing track S will render a color (e.g., green) corresponding to the cholesteric liquid crystal device 11. In other words, at this time, the cholesteric liquid crystal molecules in the liquid crystal control area 118 corresponding to the writing track S are in a planar state for showing the letter, character, word or figure. In addition, as shown in FIG. 1A, FIG. 1B and FIG. 2D, the photo sensor 121 in the photo-sensing array 12 corresponding to the writing track S may sense the luminous flux of the environment light transmitted to the photo-sensing array 12 sequentially through the first substrate 111, the cholesteric liquid crystal layer 113, the second substrate 112 and the optical opening O of the optical layer 13, and a first luminous flux is obtained accordingly.

Please refer to FIG. 1C and FIG. 2D, when the user wants to erase (delete or clear) partial or all of the writing track S, the light L can be used to irradiate the to-be-erased portion of the writing track S (e.g., the irradiation region P of FIG. 1C and FIG. 2D). The irradiation region P may be equal to or larger than the portion to be erased. In this embodiment, the irradiation region P (the dashed rectangle as shown in FIG. 1C) is larger than the to-be-erased portion (the lower part of "0" filled with white color as shown in FIG. 1C) as an example for explanation. The intensity of the light L is preferably greater than the intensity of the ambient light, and the wavelength of the light L may be located in the range of a visible light (e.g., red, blue or green light) or in the range of an invisible light (e.g., near-infrared light, far-infrared light or ultraviolet light).

When the light L irradiates the light-entering surface A1 of the cholesteric liquid crystal device 11 (as the irradiation region P in FIG. 1C and FIG. 2D), it also passes through the first substrate 111, the cholesteric liquid crystal layer 113 and the second substrate 112 and travels to the photo-sensing array 12 through the optical openings O of the optical layer 13. At this time, the photo-sensor 121' in the corresponding photo-sensing array 12 under the irradiation region P of the light L can sense the luminous flux of the light L emitted thereon, and a second luminous flux is obtained accordingly. Moreover, the difference between the first luminous flux and the second luminous flux is the luminous flux change sensed by the photo-sensor 121' in the photo-sensing array 12. In this embodiment, the second luminous flux sensed by the photo-sensor 121' is greater than the first luminous flux. Hence, the luminous flux change sensed by the one or more of the photo-sensors 121' in the photo-sensing array 12 is positive. However, the luminous flux change sensed by the photo-sensor 121 not irradiated by the light L is 0 (i.e., the second luminous flux sensed thereby is equal to the first luminous flux). Accordingly, the voltage control circuit 14 can receive the electric signals with different voltage values, which are generated by the photo sensors 121 and 121' after sensing the luminous fluxes with different intensities (the photo sensor 121' having the luminous flux change can output the erasing signal Ps). After receiving the erasing signal Ps, the voltage control circuit 14 can determine that the received signal is transmitted from which photo sensors 121'. The erasing signal Ps also contains position information (the position information of the irradiation region P) of the cholesteric liquid crystal device 11 that is irradiated by the light L. the voltage control circuit 14 can obtain the photo sensor 121' (in FIG. 2D, two photo sensors 121' are taken as an example) which sense(s) this luminous flux change locate(s) in the photo-sensing array 12 according to the erasing signal Ps (e.g., at which column and row said photo sensor(s) 121' locate(s) in the photo-sensing array 12). The position information corresponds to or represents the position of the photo sensor 121' regarding to where it locates in the irradiation region P of the light L which is irradiated on the light-entering surface A1 of the cholesteric liquid crystal device 11. Then, the outputted voltage signal Ds outputted from the voltage control circuit 14 is applied to the first electrode 1141 and the second electrode 1151' of the liquid crystal control area 118' (in FIG. 2D, two liquid crystal control areas 118' are taken as an example) corresponding to the irradiation region P, so that the orientation of cholesteric liquid crystal molecules between the first electrode 1141 and the second electrode 1151' can be changed to the focal conic state from the original planar state, so as to allow a light to substantially penetrate through the cholesteric liquid crystal layer 113 and to render the background color of the cholesteric liquid crystal device 11. Hence, the portions of the writing track S shown on the cholesteric liquid crystal writing board 1 irradiated by the light L can be erased, either partially or entirely.

To be noted, in some embodiments, the corresponding (or mapping) of the photo sensors 121 and the liquid crystal control areas 118 can be in a data format pre-stored in the memory of the voltage control circuit 14. When the voltage control circuit 14 obtains that the erasing signal Ps is from which one or more of the photo sensors 121', the position information of the liquid crystal control areas 118' corresponding to the photo sensors 121' can be retrieved from the pre-stored data, so that the voltage signal Ds can be transmitted to the liquid crystal control area 118' corresponding to the photo sensor 121' having luminous flux change for erasing, either partially or entirely, the writing track S shown on the cholesteric liquid crystal writing board 1 irradiated by the light L. In addition, in some embodiments, the coordinates of the photo sensors 121 of the photo-sensing array 12 can be pre-stored in the memory of the voltage control circuit 14, and the coordinates of the liquid crystal control areas 118 can also be pre-stored in the memory of the voltage control circuit 14. After the voltage control circuit 14 receives the erasing signal Ps and obtains the coordinates of the photo sensor 121' having the luminous flux change, it can retrieve the coordinates of the corresponding liquid control area 118' according to the stored coordinate data. Then, the voltage signal Ds can be transmitted to the liquid crystal control area 118' corresponding to the photo sensor 121' having luminous flux change for erasing, either partially or entirely, the writing track S shown on the cholesteric liquid crystal writing board 1 irradiated by the light L.

In other embodiments (explanations are made according to FIG. 2D), the first transparent electroconductive layer 114 may be a whole electrode, and is comprehensively disposed on the surface of the first substrate 111 facing toward the cholesteric liquid crystal layer 113. The second transparent electroconductive layer 115 may comprise electrode blocks (still labeled as 1151) arranged in an array, and the electrode blocks 1151 are respectively disposed in correspondence with the liquid crystal control areas 118 or the photo sensors 121 arranged in an array. A voltage gap is applied between the electrode blocks 1151 and the first transparent electroconductive layer 114 for correspondingly controlling the cholesteric liquid crystal molecules of the liquid crystal control areas 118. Herein, "comprehensively" means that the first transparent electroconductive layer 114 comprises a whole common electrode, which fully covers most of the surface of the first substrate 111 facing toward the cholesteric liquid crystal layer 113. One electrode block 1151 of the second transparent electroconductive layer 115 may correspond to a pixel electrode and correspondingly control a liquid crystal control area 118 together with the first transparent electroconductive layer 114. Hence, the voltage signal Ds may be applied to the first transparent electroconductive layer 114 and the electrode blocks 1151' (i.e., pixel electrode) in the liquid crystal control area(s) 118' corresponding to the photo sensor(s) 121' having the luminous flux change, so that the orientation of the cholesteric liquid crystal molecules in the corresponding liquid crystal control area(s) 118' can be changed to the focal conic state from the original planar state, so as to partially or entirely erase the portion(s) of the writing track S on the cholesteric liquid crystal writing board 1 irradiated by the light L.

Figure 3D:
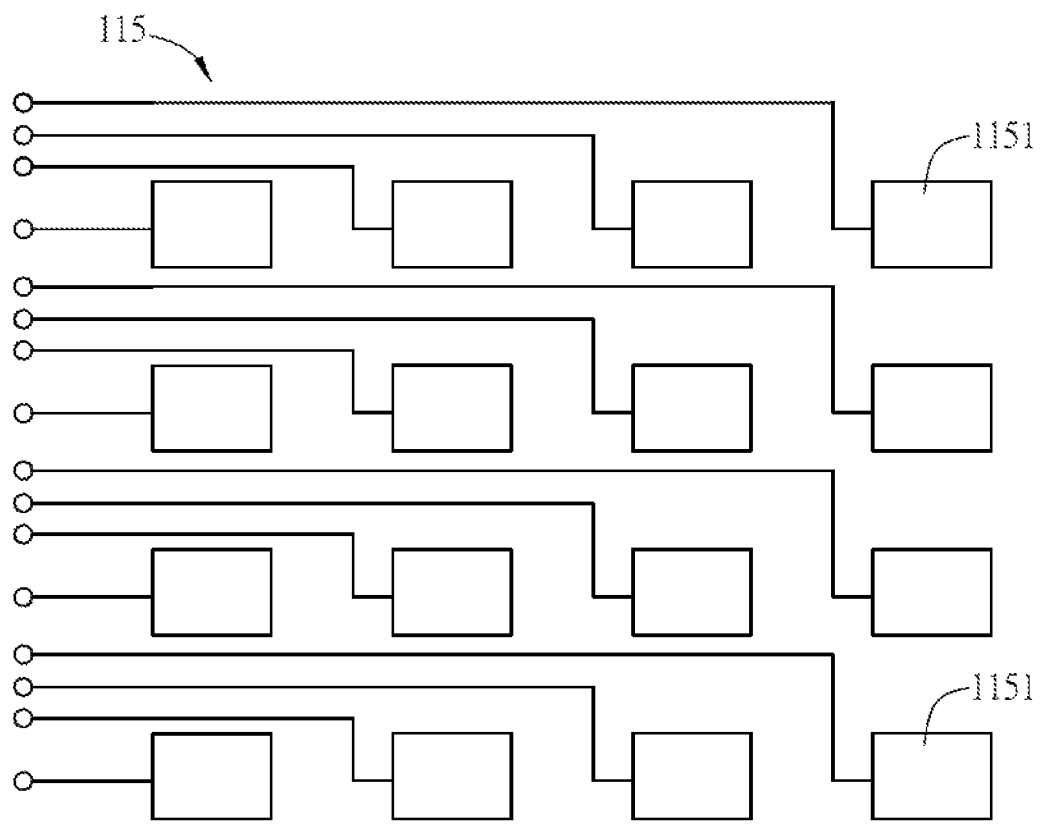
FIG. 3D is a schematic view showing another embodiment of a second transparent electroconductive layer of the cholesteric liquid crystal writing board of this disclosure.
Figure 3E:
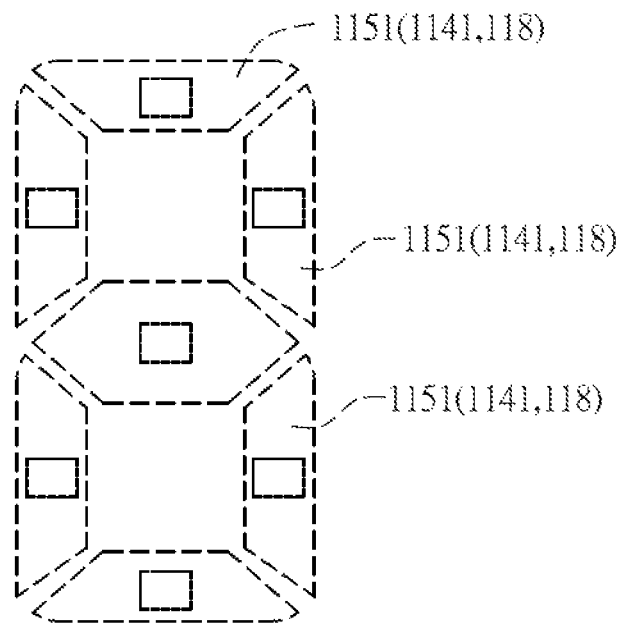
FIG. 3E is a schematic view showing another embodiment of the first transparent electroconductive layer and the second transparent electroconductive layer of the cholesteric liquid crystal writing board of this disclosure.

Alternatively, in other embodiments, as shown in FIG. 3D, which is a schematic view showing another embodiment of a second transparent electroconductive layer of the cholesteric liquid crystal writing board of this disclosure. The first transparent electroconductive layer 114 or the second transparent electroconductive layer 115 may comprise a plurality of electrode blocks. The electrode blocks are disposed in correspondence with the liquid crystal control areas 118, and the voltage signal Ds may be applied to the electrode blocks of the liquid crystal control areas 118' corresponding to the photo sensors 121' having the luminous flux change, so that the orientation of the cholesteric liquid crystal molecules in the corresponding liquid crystal control area(s) 118' can be changed to the focal conic state from the original planar state so as to partially or entirely erase the writing track S on the cholesteric liquid crystal writing board 1 irradiated by the light L. In this embodiment, for example, the second transparent electroconductive layer 115 comprises a plurality of electrode blocks 1151 arranged in an array. The electrode blocks 1151 are respectively disposed in correspondence with the liquid crystal control areas 118 or the photo sensors 121 arranged in an array, and a voltage gap can be applied between the electrode blocks 1151 and the first transparent electroconductive layer 114 to correspondingly control the liquid crystal control areas 118. Herein, the electrode block 1151 may be polygonal (e.g., square), circular, or oval, or in other shapes, and this disclosure is not limited. Alternatively, in other embodiments, the first transparent electroconductive layer 114 may also comprise a plurality of electrode blocks 1141, and the second transparent electroconductive layer 115 comprises a whole common electrode. Further alternatively, as shown in FIG. 3E, each of the first transparent electroconductive layer 114 and the second transparent electroconductive layer 115 independently comprises a plurality of electrode blocks 1141 and 1151 disposed in correspondence with each other, and each of the electrode blocks 1141 and 1151 can control the corresponding liquid crystal control area 118. In FIG. 3E, for example, the electrode blocks 1141 and 1151 are correspondingly arranged as "seven-segmented blocks." A photo sensor 121 is correspondingly provided in each of the liquid crystal control areas 118. Alternatively, a photo sensor 121 can be correspondingly provided for multiple of the liquid crystal control areas 118. As previously mentioned, the amount, configuration, location, and shape of the electrode blocks may be adjusted according to the practicing requirements, but the present invention is not limited thereto.

Referring again to FIG. 2D, the cholesteric liquid crystal writing board of this embodiment further comprises a third substrate 120, the third substrate 120 is disposed at one side of the optical layer 13 away from the cholesteric liquid crystal device 11, and the photo sensors 121 are disposed on the third substrate 120. The photo sensors 121 can be embedded in the third substrate 120 or disposed on the surface of the third substrate 120, and this disclosure is not limited. The third substrate 120 can be a rigid substrate or a flexible substrate, and a plurality of traces are formed on the third substrate 120 for electrically connecting the photo sensors 121 or transmitting the signals out. The rigid substrate can be, for example but not limited to, a printed circuit board (PCB).

Figure 4:
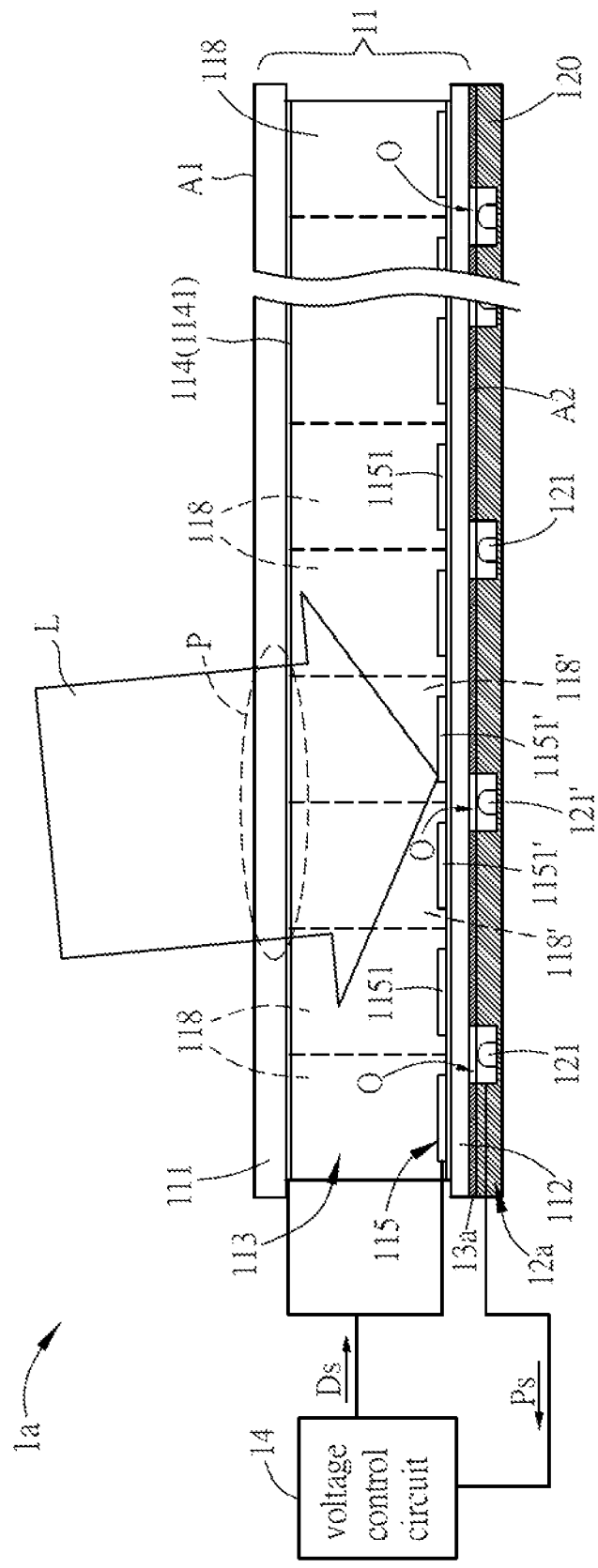
FIG. 4 is a schematic view showing another embodiment of the cholesteric liquid crystal writing board of FIG. 1A.

FIG. 4 is a schematic view showing another embodiment of the cholesteric liquid crystal writing board of FIG. 1A. As shown in FIG. 4, the cholesteric liquid crystal writing board 1a of this embodiment and the cholesteric liquid crystal writing board 1 of the foregoing embodiment are substantially the same in the composition and the connection relationship of the components. The difference is that, in the cholesteric liquid crystal writing board 1a, multiple liquid crystal control areas 118 (e.g., two liquid crystal control areas 118) correspond to one optical opening O and one photo sensor 121 (the number of the optical opening O is equal to the number of the photo sensor 121). In addition, since the light L irradiates the photo sensor 121' to cause luminous flux change, the voltage control circuit 14 can receive the erasing signal Ps and output the voltage signal Ds to the liquid crystal control area 118 corresponding to the photo sensor 121 having luminous flux change, so that the cholesteric liquid crystals corresponding to partial or all portions of the liquid crystal control areas 118 are morphologically changed to erase, partially or entirely, the writing track S accordingly. The related technical contents for utilizing the additional light irradiation to erase, partially or entirely, the writing track S can be referred to the above embodiment, so the detailed descriptions thereof will be omitted.

To sum up, in the cholesteric liquid crystal writing board of this disclosure, the cholesteric liquid crystal device has a plurality of liquid crystal control areas. The optical layer is disposed at a side of the cholesteric liquid crystal device opposite to the light-entering surface and has a plurality of optical openings disposed corresponding to the liquid crystal control areas. The photo-sensing array comprises a plurality of photo sensors arranged in an array and is disposed at a side of the optical layer away from the cholesteric liquid crystal device, and the photo sensors are disposed corresponding to the optical openings. One of the photo sensors senses a luminous flux change and generates an erasing signal accordingly. The voltage control circuit receives the erasing signal and outputs a voltage signal accordingly to the liquid crystal control areas corresponding to the photo sensors having the luminous flux change, such that a part or all of cholesteric liquid crystals corresponding to the liquid crystal control areas are morphologically changed so as to clear a part or all of the writing trace. Accordingly, the cholesteric liquid crystal writing board of this disclosure can utilize the properties of the cholesteric liquid crystals, so that it can achieve power-saving and perform a function of erasing a partial portion, thereby expanding the application of the cholesteric liquid crystal writing board on the teaching or conference.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A cholesteric liquid crystal writing board, which is capable of displaying a writing track, comprising:
   a cholesteric liquid crystal device comprising a cholesteric liquid crystal layer, wherein the cholesteric liquid crystal device has a light-entering surface and a plurality of liquid crystal control areas;

an optical layer disposed at a side of the cholesteric liquid crystal device opposite to the light-entering surface, wherein the optical layer has a plurality of optical openings disposed corresponding to the liquid crystal control areas;

a photo-sensing array disposed at a side of the optical layer away from the cholesteric liquid crystal device, wherein the photo-sensing array comprises a plurality of photo sensors arranged in an array, the photo sensors are disposed corresponding to the optical openings, one of the photo sensors senses a luminous flux change and generates an erasing signal accordingly, and the photo sensor corresponds to at least one of the liquid crystal control areas; and a voltage control circuit coupled to the photo-sensing array and the cholesteric liquid crystal device, wherein the voltage control circuit receives the erasing signal and outputs a voltage signal accordingly to the liquid crystal control areas corresponding to the photo sensors having the luminous flux change, such that a part or all of cholesteric liquid crystals corresponding to the liquid crystal control areas are morphologically changed so as to clear a part or all of the writing trace.

2. The cholesteric liquid crystal writing board according to claim 1, wherein the cholesteric liquid crystal device further comprises a first substrate and a second substrate opposite to the first substrate, the cholesteric liquid crystal layer is disposed between the first substrate and the second substrate, the cholesteric liquid crystal device further comprises a first transparent electroconductive layer disposed on a surface of the first substrate facing toward the cholesteric liquid crystal layer, and the cholesteric liquid crystal device further comprises a second transparent electroconductive layer disposed on one side of the second substrate facing toward the cholesteric liquid crystal layer.

3. The cholesteric liquid crystal writing board according to claim 2, wherein the first transparent electroconductive layer comprises a plurality of first electrodes extending in a first direction and separately disposed, the second transparent electroconductive layer comprises a plurality of second electrodes extending in a second direction and separately disposed, and the first direction is different from the second direction.

4. The cholesteric liquid crystal writing board according to claim 3, wherein when viewing from a top of the light-entering surface, the first electrodes are crossed with the second electrodes and their intersections are disposed in correspondence to the liquid crystal control areas.

5. The cholesteric liquid crystal writing board according to claim 4, wherein the voltage signal is applied to the first electrode and the second electrode, which correspond to the liquid crystal control areas corresponding to the photo sensor having the luminous flux change, so that a part or all of the cholesteric liquid crystals corresponding to the liquid crystal control areas are morphologically changed.

6. The cholesteric liquid crystal writing board according to claim 2, wherein the second transparent electroconductive layer comprises a plurality of electrode blocks arranged in an array, and the electrode blocks are disposed in correspondence with the liquid crystal control areas.

7. The cholesteric liquid crystal writing board according to claim 6, wherein the voltage signal is applied to the electrode blocks of the liquid crystal control areas corresponding to the photo sensor having the luminous flux change, so that a part or all of the cholesteric liquid crystals corresponding to the liquid crystal control areas are morphologically changed.

8. The cholesteric liquid crystal writing board according to claim 2, wherein the first transparent electroconductive layer and the second transparent electroconductive layer comprise a plurality of electrode blocks, which are disposed corresponding to each other, and the electrode blocks are disposed in correspondence with the liquid crystal control areas.

9. The cholesteric liquid crystal writing board according to claim 8, wherein the voltage signal is applied to the electrode blocks of the liquid crystal control areas corresponding to the photo sensor having the luminous flux change, so that a part or all of the cholesteric liquid crystals corresponding to the liquid crystal control areas are morphologically changed.

10. The cholesteric liquid crystal writing board according to claim 1, wherein the optical layer is a light-absorbing layer.

11. The cholesteric liquid crystal writing board according to claim 1, wherein the optical layer is a light-reflecting layer.

12. The cholesteric liquid crystal writing board according to claim 1, further comprising:

a third substrate, wherein the photo sensors are disposed on the third substrate.

13. The cholesteric liquid crystal writing board according to claim 1, wherein a light irradiates the light-entering surface of the cholesteric liquid crystal device to generate the luminous flux change, and the erasing signal comprises position information regarding to where the cholesteric liquid crystal device is irradiated by the light.

14. The cholesteric liquid crystal writing board according to claim 13, wherein the light is a visible light or an invisible light.

* * * * *